US010592846B1

(12) United States Patent
Gaurav et al.

(10) Patent No.: US 10,592,846 B1
(45) Date of Patent: Mar. 17, 2020

(54) ELECTRONICALLY MONITORING DATA STORAGE EQUIPMENT WHILE THE DATA STORAGE EQUIPMENT IS IN TRANSIT

(71) Applicant: EMC IP Holding Company LLC, Hopkinton, MA (US)

(72) Inventors: Natasha Gaurav, Hopkinton, MA (US); Gregory W. Lazar, Upton, MA (US); Scott E. Joyce, Foxboro, MA (US); Girish Sheelvant, Hopkinton, MA (US); Himabindu Tummala, South Grafton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 431 days.

(21) Appl. No.: 15/194,858

(22) Filed: Jun. 28, 2016

(51) Int. Cl.
  *G06Q 10/08* (2012.01)
  *G06F 1/28* (2006.01)
  *G06F 1/26* (2006.01)
  *H04W 4/02* (2018.01)

(52) U.S. Cl.
  CPC ......... *G06Q 10/0833* (2013.01); *G06F 1/263* (2013.01); *G06F 1/28* (2013.01); *H04W 4/02* (2013.01)

(58) Field of Classification Search
  CPC ....... G06Q 10/0833; H04W 4/02; G06F 1/28; G06F 1/263
  USPC .......................................................... 705/333
  See application file for complete search history.

(56) References Cited

U.S. PATENT DOCUMENTS

| 6,550,029 | B1 | 4/2003 | Bailey et al. | |
|---|---|---|---|---|
| 8,006,842 | B1 | 8/2011 | Loughlin, Jr. et al. | |
| 8,458,483 | B1 | 6/2013 | Bailey et al. | |
| 8,749,239 | B2 * | 6/2014 | Nielsen | G01V 3/15 324/329 |
| 9,552,569 | B1 * | 1/2017 | Quan | G06Q 10/087 |
| 2004/0243285 | A1 * | 12/2004 | Gounder | G07C 5/008 701/1 |
| 2005/0253703 | A1 * | 11/2005 | He | G01S 5/02 340/539.13 |
| 2007/0296581 | A1 * | 12/2007 | Schnee | G06Q 10/08 340/572.1 |
| 2008/0129488 | A1 * | 6/2008 | Hill | G06Q 10/08 340/539.13 |

(Continued)

OTHER PUBLICATIONS

Enhanced Logistics Tracking and Monitoring Through Sensor Technology ; Plinksky, Janina; Rodgers, Jerry; Army Logistician, PB 700-08-04 vol. 40, Issue 4 (Year: 2008).*

*Primary Examiner* — Kevin H Flynn
*Assistant Examiner* — Dione N. Simpson
(74) *Attorney, Agent, or Firm* — BainwoodHuang

(57) ABSTRACT

A technique is directed to transporting data storage equipment. The technique involves electronically activating monitoring circuitry which is co-located with the data storage equipment. The technique further involves, after the monitoring circuitry is electronically activated, receiving location data from the monitoring circuitry while the data storage equipment is en route from a first ground location to a second ground location. The technique further involves, based on the location data, performing a set of location evaluation operations to determine whether the data storage equipment is on course along a predefined route between the first ground location and the second ground location.

21 Claims, 5 Drawing Sheets

(56) References Cited

U.S. PATENT DOCUMENTS

| | | | | |
|---|---|---|---|---|
| 2010/0069087 A1* | 3/2010 | Chow | ............... | G08B 21/023 |
| | | | | 455/456.1 |
| 2013/0342343 A1* | 12/2013 | Harring | ............... | G08B 21/18 |
| | | | | 340/521 |
| 2014/0372335 A1* | 12/2014 | Jones | ............... | G06Q 10/0833 |
| | | | | 705/333 |
| 2016/0105207 A1* | 4/2016 | Rosen | ............... | G01S 19/34 |
| | | | | 455/575.8 |
| 2016/0379165 A1* | 12/2016 | Moakley | ............... | H04W 4/046 |
| | | | | 705/333 |

* cited by examiner

ELECTRONICALLY MONITORING DATA STORAGE EQUIPMENT WHILE THE DATA STORAGE EQUIPMENT IS IN TRANSIT

BACKGROUND

A conventional data storage system includes one or more electronic cabinets or equipment chassis. Each electronic cabinet or chassis may include storage disks, storage processors, batteries, etc.

Occasionally, the owner of the data storage system may decide to physically ship the data storage system from one installation site to another installation site (e.g., from one building to another building, one city to another city, one state to another state, etc.). In such a situation, the owner of the data storage system may hire a professional transportation company to transport the data storage system between installation sites. Typically, the professional transportation company uses one or more pallets and/or shipping containers to transport the data storage system, and tracks the delivery status of the pallets/containers by scanning shipping labels affixed to the pallets/containers.

SUMMARY

Unfortunately, there are deficiencies to the above described conventional process of tracking the delivery status of pallets/containers used to ship data storage systems. Along these lines, suppose that a bad situation arises during transport. In particular, a data storage system could be lost or stolen while in the custody of the professional transportation company. Additionally, the data storage system could be tampered with while in the custody of the professional transportation company (e.g., the data storage system could be powered on, the storage disks could be removed/read, etc.).

In these situations, the owner of the data storage system may not be notified by the professional transportation company until a significant amount of time has elapsed. In particular, to uphold its reputation, the professional transportation company may attempt to perform a lengthy and thorough investigation in hope of finding a lost/stolen data storage system and/or to assess the extent of data storage system tampering. During this time, more opportunity exists for a malicious person to access any data on the data storage system. Moreover, the owner of the data storage system is at the complete mercy of the professional transportation company in terms of available information regarding the loss, theft or tampering of the data storage system.

In contrast to the above-described conventional process for shipping a data storage system in which the owner of the data storage system may experience status delays and/or receive only limited information regarding a bad situation, improved techniques are directed to electronically monitoring data storage equipment while the data storage equipment is in transit. Such techniques provide improvements to the technology, e.g., immediate notification when the data storage equipment is off course, alerts due to events such as loss of backup power/tampering/etc., collection of internal/external data regarding an event, and so on. Since such information may be received directly from monitoring circuitry that is part of the data storage equipment or that is attached to the data storage equipment, there is no reliance on any professional transportation company. Moreover, in high security situations, the ability to read data from the data storage equipment may be destroyed thus robustly and reliably protecting the data from falling into the hands of a malicious person.

One embodiment is directed to a method of transporting data storage equipment. The method includes electronically activating monitoring circuitry which is co-located with the data storage equipment. The method further includes, after the monitoring circuitry is electronically activated, receiving location data from the monitoring circuitry while the data storage equipment is en route from a first ground location to a second ground location. The method further includes, based on the location data, performing a set of location evaluation operations to determine whether the data storage equipment is on course along a predefined route between the first ground location and the second ground location.

In some arrangements, receiving the location data from the monitoring circuitry includes acquiring a current location identifier from the monitoring circuitry while the data storage equipment is en route from the first ground location to the second ground location. In these arrangements, the current location identifier identifies a current location of the data storage equipment.

In some arrangements, performing the set of location evaluation operations includes performing a comparison operation. The comparison operation compares the current location identified by the current location identifier to a predefined set of route locations defined by the predefined route between the first ground location and the second ground location to determine whether the data storage equipment is currently on course.

In some arrangements, the method further includes providing an off course alert when a result of the comparison operation indicates that the data storage equipment is off course by a predefined distance. Suitable example distances include five miles, 10 miles, 20 miles, and so on. A variety of measurement approaches are suitable for use as well, e.g., land or statute miles, air miles, road distances, metric units, etc.

In some arrangements, the method further includes providing an on course alert when a result of the comparison operation indicates that the data storage equipment has reached a particular route location of the predefined set of route locations defined by the predefined route between the first ground location and the second ground location.

In some arrangements, the method further includes providing a state line alert when a result of the comparison operation indicates that the data storage equipment has crossed a state line between two bordering states of the United States of America, a town/city line between two bordering towns/cities, a country line between two bordering countries, etc.

In some arrangements, electronically activating the monitoring circuitry which is co-located with the data storage equipment includes powering on the monitoring circuitry such that the monitoring circuitry consumes power from a battery backup power supply of the data storage equipment.

In some arrangements, the method further includes configuring the monitoring circuitry to consume power from a secondary power supply which is different from the battery backup power supply of the data storage equipment when the monitory circuitry is no longer able to consume power from the battery backup power supply of the data storage equipment.

In some arrangements, the method further includes configuring the monitoring circuitry to provide a power alert when the monitory circuitry is no longer able to consume power from the battery backup power supply of the data storage equipment for a period of time. For example, when the available power supply drops below 10%, the monitoring circuitry may communicate the power alert and all the information it has available.

In some arrangements, the method further includes receiving a tamper alert from the monitoring circuitry when the monitoring circuitry detects that the data storage equipment has encountered a tampering event.

In some arrangements, the method further includes, in response to the tamper alert, collecting surveillance data from the monitoring circuitry. Collecting the surveillance data may include electronically reading status information from electronic circuitry of the data storage equipment and conveying that status information to a central office. Collecting the surveillance data may also include electronically gathering environmental information from a current external environment of the data storage equipment and conveying that environmental information to a central office.

In some arrangements, the method further includes, in response to the tamper alert, placing host data which is stored in the data storage equipment in an unintelligible state. Here, placing the host data on the data storage equipment into the unintelligible state may include destroying access to a set of keys which is required to decrypt the host data on the data storage system to prevent the host data on the data storage system from being understood.

In some arrangements, the method further includes, prior to electronically activating the monitoring circuitry, electronically connecting the monitoring circuitry to the data storage equipment in preparation for shipping the data storage equipment from the first ground location to the second ground location. Additionally, the method may further include electronically disconnecting the monitoring circuitry from the data storage equipment upon arrival of the data storage equipment at the second ground location, the monitoring circuitry including a geolocation circuit that is constructed and arranged to identify a current geolocation of the monitoring circuitry, and a transceiver that is constructed and arranged to wirelessly transmit the current geolocation of the monitoring circuitry to a central office.

In some arrangements, the method further includes, after the monitoring circuitry has been activated and at least some location data has been received from the monitoring circuitry, outputting a lost equipment alert in response to an absence of receiving further location data from the monitoring circuitry for a predefined amount of time.

Another embodiment is directed to an electronic apparatus which includes memory, and control circuitry coupled to the memory. The memory stores instructions which, when carried out by the control circuitry, cause the control circuitry to:
(A) electronically establish communications with monitoring circuitry which is co-located with data storage equipment,
(B) after communications with the monitoring circuitry have been electronically established, receive location data from the monitoring circuitry while the data storage equipment is en route from a first ground location to a second ground location, and
(C) based on the location data, perform a set of location evaluation operations to determine whether the data storage equipment is on course along a predefined route between the first ground location and the second ground location.

Yet another embodiment is directed to a computer program product having a non-transitory computer readable medium which stores a set of instructions to monitor transportation of data storage equipment. The set of instructions, when carried out by computerized circuitry, causing the computerized circuitry to perform a method of:
(A) electronically establishing communications with monitoring circuitry which is co-located with data storage equipment;
(B) after communications with the monitoring circuitry have been electronically established, receiving location data from the monitoring circuitry while the data storage equipment is en route from a first ground location to a second ground location; and
(C) based on the location data, performing a set of location evaluation operations to determine whether the data storage equipment is on course along a predefined route between the first ground location and the second ground location.

It should be understood that, in the cloud context, at least some of electronic circuitry (e.g., circuitry of a central monitoring service or a central office) is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in electronically monitoring data storage equipment while the data storage equipment is in transit.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to electronically monitoring data storage equipment while the data storage equipment is in transit. Such a technique provides improvements to the technology, e.g., immediate notification when the data storage equipment is off course, an alert due to an event such as loss of backup power/tampering/etc., the ability to collect internal/external data regarding the event, etc. Since such information may be acquired directly from monitoring circuitry that is part of the data storage equipment or that is attached to the data storage equipment, there is no reliance on any professional transportation company which could delay notification or withhold information regarding where/when/how the data storage equipment was stolen or tampered with. In some arrangements, the ability to read data from the data storage equipment may be destroyed upon receipt of such notification thus robustly and reliably protecting the data from falling into the hands of a malicious person.

Figure 1:
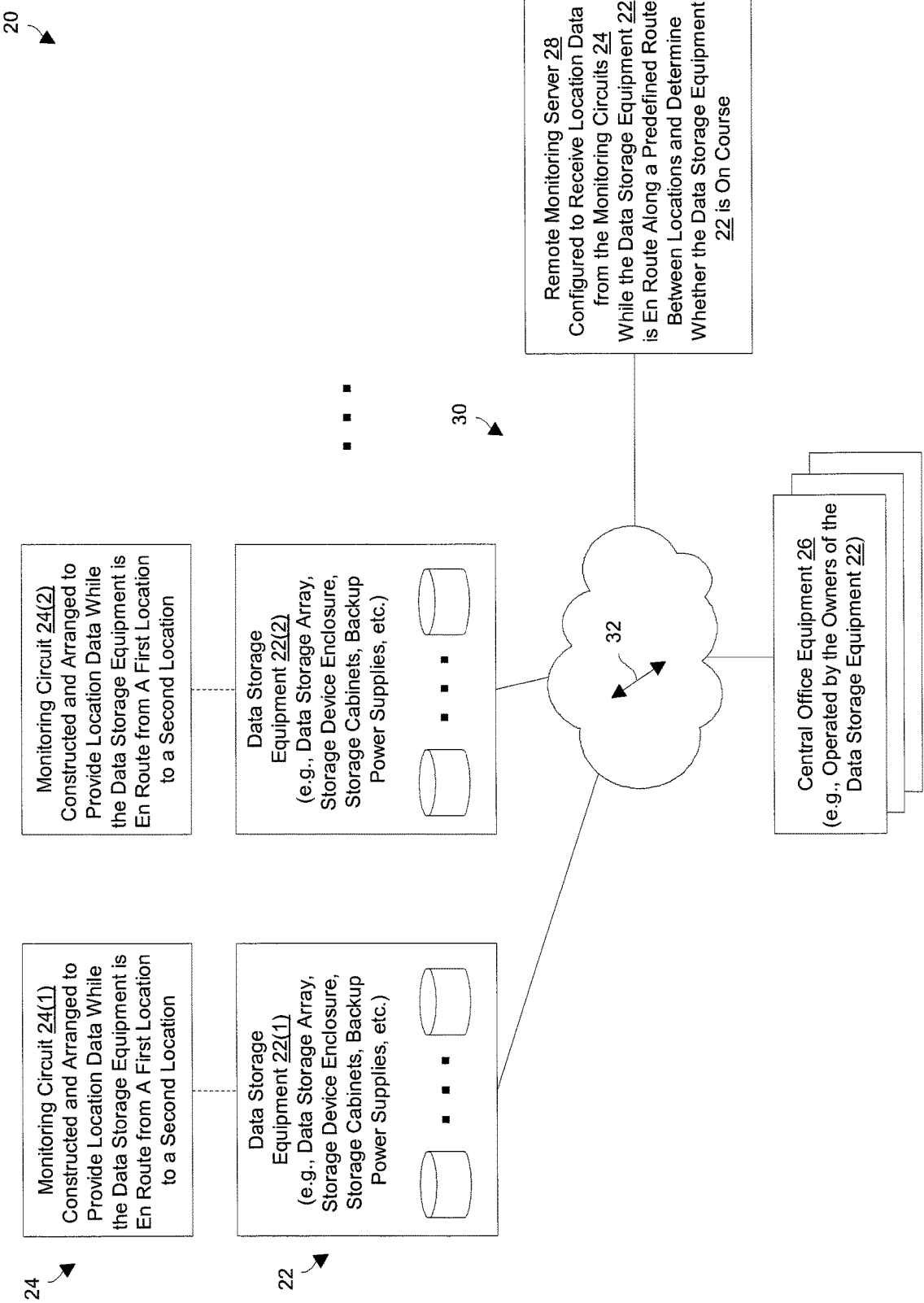
FIG. 1 is a block diagram of an electronic environment in which data storage equipment is electronically monitored while the data storage equipment is in transit.

FIG. 1 shows an electronic environment 20 in which data storage equipment (e.g., a data storage system, a data storage array, a set of peripheral devices, combinations thereof, etc.) is electronically monitored while the data storage equipment is in transit. The electronic environment 20 includes data storage equipment 22(1), 22(2), . . . (collectively, data storage equipment 22), monitoring circuits 24(1), 24(2), . . . (collectively, monitoring circuits 24), central office equipment 26, a remote monitoring server 28, and communications medium 30.

The data storage equipment 22 (e.g., data storage arrays, storage enclosures, etc.) is constructed and arranged to perform data storage operations (e.g., to process SCSI requests by storing and retrieving host data) on behalf of a set of host computers. In particular, the data storage equipment 22(1) includes a set of cabinets or enclosures which hold specialized data storage hardware such as storage processors, storage devices such as flash memory drives and/or magnetic disk drives, network interfaces, power supplies, batteries for backup power, combinations thereof, and so on. In some arrangements, the storage devices form one or more tiers of storage that store various storage objects (e.g., logical units of storage or LUNs, volumes, file systems, RAID groups, combinations thereof, and so on).

The monitoring circuits 24 are disposed with respective data storage equipment 22. In particular, the monitoring circuit 24(1) resides with the data storage equipment 22(1), the monitoring circuit 24(2) resides with the data storage equipment 22(2), and so on. Each monitoring circuit 24 is constructed and arranged to provide location data to the monitoring server 28 while the respective data storage equipment 22 is in transit or en route between a starting location and a destination location. Such location information may include a current geolocation or ground coordinate, electronic status of the respective data storage equipment 22, environmental data, alerts, and so on. Although direct lines are not explicitly shown in FIG. 1 between each monitoring circuit 24 and the communications medium 30, it should be understood that each monitoring circuit 24 is able to communicate with other parts of the electronic environment 20 (e.g., with the monitoring server 28) through the communications medium 30.

In some arrangements, the monitoring circuits 24 are separate devices having a form factor similar to that of a tablet, a smart phone, or other mobile apparatus. In these arrangements, the monitoring circuits 24 physically couple to the respective data storage equipment 22, e.g., via a cable, via a harness, etc. In some arrangements, the monitoring circuits 24 derive power from battery backup assemblies of the respective data storage equipment 22.

In other arrangements, the monitoring circuits 24 are more tightly integrated with the respective data storage equipment 24. For example, the monitoring circuits 24 may be housed within the cabinets/enclosures of the data storage equipment 22, the monitoring circuits 24 may connected to the backplanes/mid-planes/door panels/etc. sense whether components are tampered with, removed, etc.

In certain arrangements, the monitoring circuits 24 may perform other functions in addition to providing location data to the monitoring server 24. For example, the monitoring circuits 24 may be also operate as part of a service processor that enables a human administrator to configure and/or operate the data storage equipment 22.

The central office equipment 26 represents additional computerized equipment that belongs to the same entities that operate the data storage equipment 22. Along these lines, an owner of the data storage equipment 22(1) may operate a central office that routinely communicates with the data storage equipment 22(1) (e.g., the central office equipment 26 for that owner may manage the data storage equipment 22(1), may maintain a backup copy of the data on the data storage equipment 22(1), etc.). Likewise, an owner of the data storage equipment 22(2) may operate another central office that routinely communicates with the data storage equipment 22(2), and so on.

The remote monitoring server 28 is constructed and arranged to receive location data from the monitoring circuits 24 while their respective data storage equipment 22 travels from one location to another. During such time, the monitoring server 28 may detect a bad situation with certain data storage equipment 22 (e.g., a tampering event, a deviation of the data storage equipment 22 from a predefined route, etc.). Accordingly, the central office equipment 26 may be notified immediately regardless of whether any professional transportation company is involved.

It should be understood that the monitoring circuitry 24 may be operated by a third party that is different from the owners of the data storage equipment 22. In such third party service arrangement, the monitoring circuitry 24 is able to monitor the data storage equipment 22(1), 22(2), . . . of multiple entities (e.g., different owners) individually and concurrently, and separately communicate their status in real time to the multiple entities (i.e., to central offices).

The communications medium 30 is constructed and arranged to connect the various components of the electronic environment 20 together to enable these components to exchange electronic signals 32 (e.g., see the double arrow 32). At least a portion of the communications medium 30 is illustrated as a cloud to indicate that the communications medium 30 is capable of having a variety of different topologies including backbone, hub-and-spoke, loop, irregular, combinations thereof, and so on. Along these lines, the communications medium 30 may include copper-based data communications devices and cabling, fiber optic devices and cabling, wireless devices, combinations thereof, etc. Furthermore, the communications medium 30 is capable of supporting LAN-based communications, SAN-based communications, cellular communications, combinations thereof, etc.

During operation, the data storage equipment 22 performs load and store operations on behalf of host computers. Such data storage equipment 22 may perform specialized data storage operations such as load balancing SCSI operations, tiering, data encryption/decryption, data deduplication, snapshotting, archiving/backups, data replication, data storage failover, data reconstruction/recovery, and so on.

At some point, the owner of particular data storage equipment 22 may decide to move that data storage equipment 22 from a current location to a new location. Regarding such a move, the owner (or operator) of the particular data storage equipment 22 may have concerns regarding the security of the data that currently resides on the data storage equipment 22.

When particular data storage equipment 22 is ready for transport along a route from a source location to a destination location, the monitoring circuit 24 of the respective data storage equipment 22 is activated and thus begins routinely sending location data as well as other status to the monitoring server 28. Such operation may involve wireless transmissions such as via cellular communications, wireless Ethernet, Bluetooth, and so on.

After the monitoring circuit 24 is activated, the monitoring server 28 routinely receives the location data from the monitoring circuit 24. Such receipt may occur even while the data storage equipment 22 is in transit (e.g., at a transfer facility, while in a hanger, while en route in a railcar, while en route on a truck, etc.).

Based on the location data, the monitoring server 28 performs a set of location evaluation operations to determine whether the data storage equipment 22 is on course along a predefined route between the source location and the destination location. During the time, the owner of the data storage equipment 22 is able to check the status of the data storage equipment 22 by querying the monitoring server 28 (e.g., via a website, via automated notifications, etc.).

Moreover, if the monitoring server 28 detects a particular event (e.g., tampering, off course, etc.) the monitoring server 28 may automatically send an alert to the owner. Since such operation is independent of any professional transportation company that is involved in moving the data storage equipment 22, the status is delivered impartially and without any delay. Further details will now be provided with reference to FIG. 2.

Figure 2:
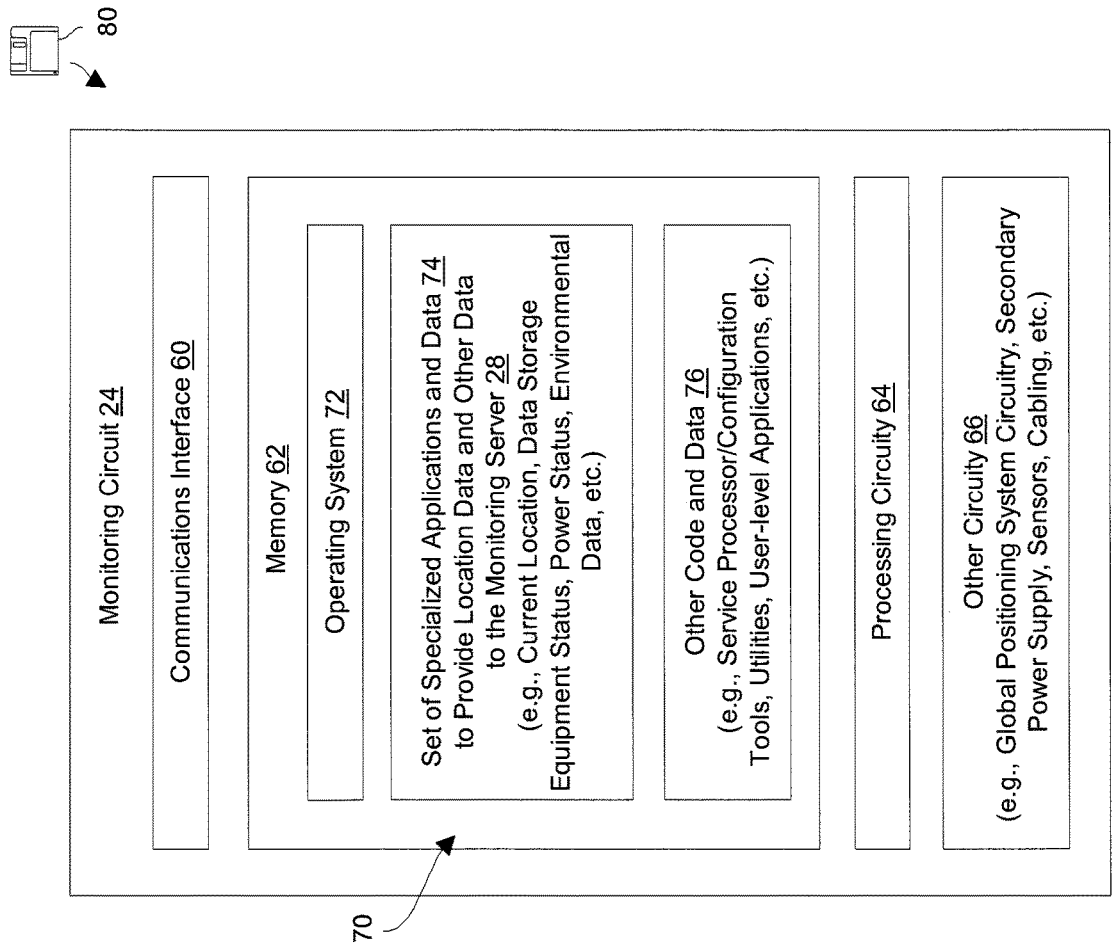
FIG. 2 is a block diagram of electronic circuitry which is used to electronically monitor the data storage equipment while the data storage equipment is in transit.

FIG. 2 shows details of a monitoring circuit 24 which electronically monitors respective data storage equipment 22 and provides location data while the data storage equipment 22 is in transit. The monitoring circuit 24 includes a communications interface 60, memory 62, processing circuitry 64, and other circuitry 66. In some arrangements, the monitoring circuit 24 is loosely coupled to the data storage equipment 22 (e.g., physically attached, electronically tethered, etc.). In other arrangements, the monitoring circuit 24 is more tightly connected to the data storage equipment 22 (e.g., the monitoring circuit 24 and the data storage equipment 22 share the same housing/cabinet, the monitoring circuit 24 is tied to a backplane or mid-plane of the data storage equipment 22, the monitoring circuit 24 connects to sensors installed within the data storage equipment 22, etc.).

The communications interface 60 is constructed and arranged to connect the monitoring circuit 24 to the communications medium 30 (also see FIG. 1) to enable communications with other devices of the electronic environment 20 (e.g., monitoring circuitry 24, central office equipment 26, etc.). Such communications may be IP-based, SAN-based, cellular-based, cable-based, fiber-optic based, wireless, cloud-based, combinations thereof, and so on. Accordingly, the communications interface 60 enables the monitoring circuit 24 to robustly and reliably communicate with other external apparatus.

The memory 62 is intended to represent both volatile storage (e.g., DRAM, SRAM, etc.) and non-volatile storage (e.g., flash memory, magnetic memory, etc.). The memory 62 stores a variety of software constructs 70 including an operating system 72, a set of specialized applications and data 74, and other applications and data 76. The operating system 72 is intended to refer to specialized code such as a kernel to manage resources of the monitoring circuit 24 (e.g., processor cycles, memory space, etc.), drivers (e.g., an I/O stack), and so on. The set of specialized applications and data 74 includes specialized code that enables the monitoring circuit 24 to identify its current location, monitor status of the respective data storage equipment 22, collect environmental information (e.g., images, sounds, etc.), and convey that information to the monitoring server 28. The other applications and data 76 such as service processor applications for configuring and managing the respective data storage system 22, user-level applications, other administrative tools, utilities, and so on.

The processing circuitry 64 is constructed and arranged to operate in accordance with the various software constructs 70 stored in the memory 62. As will be explained in further detail shortly, the processing circuitry 64 operates in accordance with the set of specialized applications and data 74 to gather and communicate data to the monitor server 28 while the monitoring circuit 24 and the respective data storage equipment 22 is in transit. Such processing circuitry 64 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 70 to the monitoring circuit 24. In particular, the computer program product 80 has a non-transitory (or non-volatile) computer readable medium which stores a set of instructions which controls one or more operations of the monitoring circuit 24. Examples of suitable computer readable storage media include tangible articles of manufacture and apparatus which store instructions in a non-volatile manner such as CD-ROM, DVD, flash memory, disk memory, tape memory, and the like.

The other circuitry 66 of the monitoring circuit 24 represents additional circuits, components, and other hardware such as global positioning system (GPS) circuitry to detect geolocation, a secondary power supply to power the monitoring circuit 24 in the absence of backup power from the data storage equipment 22, sensors such as a camera or a microphone, cabling to connect/interface the monitoring circuit 24 with the data storage equipment 22, and so on. Further details will now be provided with reference to FIG. 3.

Figure 3:
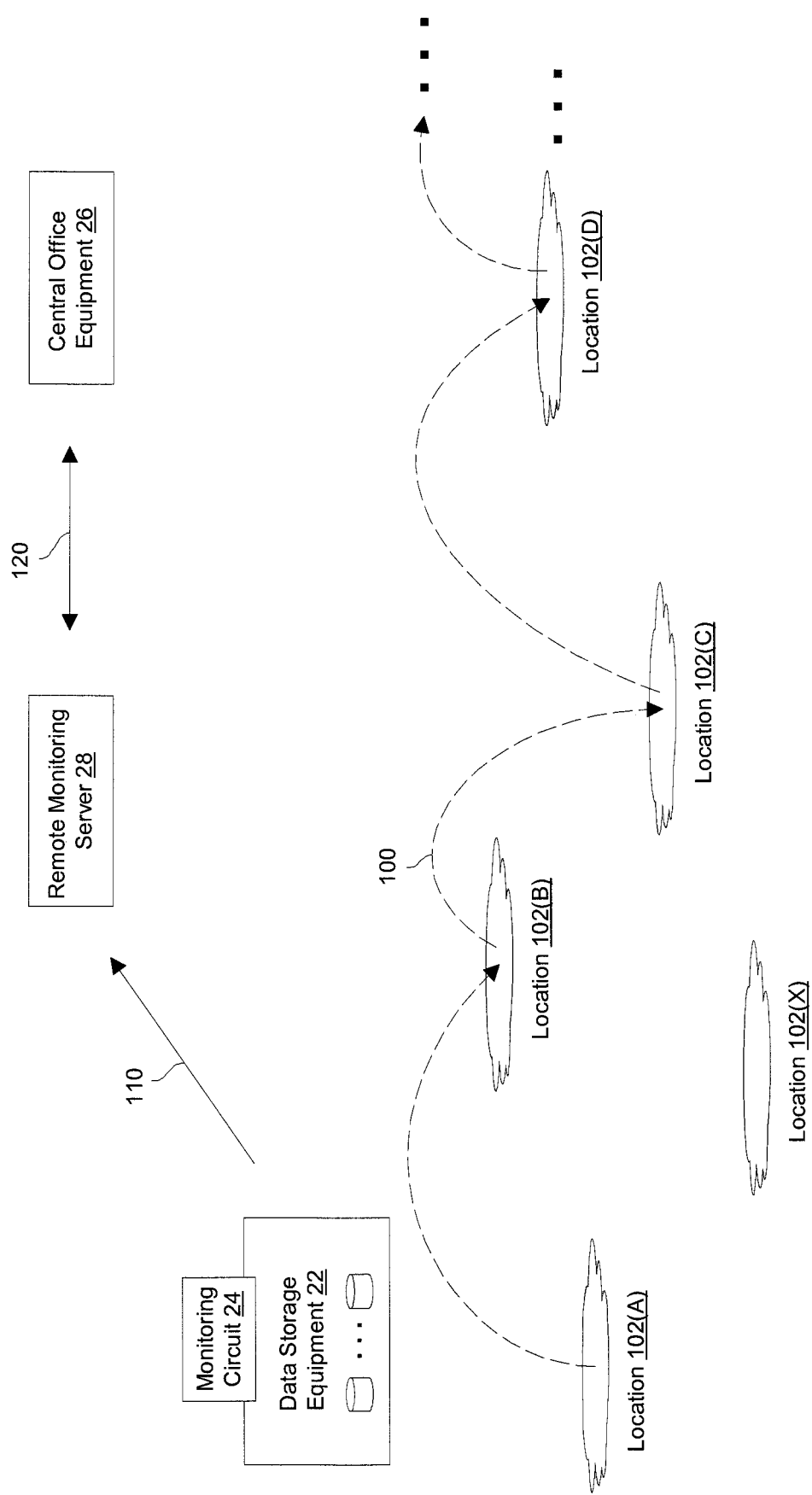
FIG. 3 is a block diagram illustrating particular details of a data storage equipment transportation situation.

FIG. 3 shows particular details of a data storage equipment transportation situation. Here, the data storage equipment 22 and the monitoring circuit 24 are in transit along a predefined route 100 formed along locations 102(A), 102(B), 102(C), 102(D), etc. Location 102(X) is considered off course because the location 102(X) is more than a predefined distance threshold from the set of coordinates along the predefined route 100. Example predefined distance thresholds include 5 miles, 10 miles, 20 miles, etc. Other distances are suitable for the threshold as well. Additionally, a variety of measurement approaches are suitable for use including measuring land or statute miles, air miles, road distances, and so on.

While the data storage equipment 22 and the monitoring circuit 24 are in transit together, the monitoring circuit 24 routinely communicates with the remote monitoring server 28 (also see FIG. 1). In particular, the monitoring circuit 24 provides a series of wireless messages 110 to the monitoring server 28 (also see the electronic signals 32 in FIG. 1). Such wireless messages 110 may be sent in response to a timer (e.g., every 15 minutes, every 30 minutes, every hour, etc.). Moreover, such wireless messages 110 may be event driven (e.g., sent in response to detection of a tampering event, sent in response to detection of reaching a particular location 102, sent in response to detection of a lower power level, etc.). Each wireless message 110 includes a location identifier that identifies a current location of the data storage equipment 22 and the monitoring circuit 24. In some arrangements, the location identifier includes or is based on a set of GPS coordinates.

It should be understood that the wireless messages 110 may contain additional information as well. Examples of the additional information include status of how much battery power remains in the data storage equipment 22, status of how much battery power remains in the monitoring circuit 24, tampering status of the data storage equipment 22, temperature and other ambient conditions, images, sounds, and so on.

In response to receipt of each wireless message 110, the remote monitoring server 28 performs a set of operations to determine whether the data storage equipment 22 and the monitoring circuit 24 are in a good situation or a bad situation. Along these lines, if the identified location is off course from the predefined route 100 by more than the predefined distance threshold, the monitoring server 28 considers the data storage equipment 22 to be in a bad situation (e.g., possibly lost or stolen). Likewise, if the message 100 indicates that the data storage equipment 22 has been tampered with or if the monitoring server 28 loses access to power from the data storage equipment 22 (e.g., due to disconnection by a thief) and has switched to a secondary power source (e.g., internal battery power), the monitoring server 28 considers the data storage equipment 22 to be in a bad situation. Other situations can be deemed good or bad, e.g., based on a set of rules, policies, configuration settings, etc.

While the monitoring server 28 deems the data storage equipment 22 and the monitoring circuit 24 to be in a good situation, the central office equipment 26 is able to query the monitoring server 28 for data storage equipment status (e.g., current location, tamper status, power levels, ambient conditions, etc.). Such operation may take the form of a login followed by navigation among a set of webpages to obtain such status. The monitoring server 28 may also send a wireless message 120 to the central office equipment 26 reporting that the data storage equipment 22 and the monitoring circuit 24 have reached a designated location 102.

Moreover, when the monitoring server 28 deems the data storage equipment 22 and the monitoring circuit 24 to be in a bad situation, the monitoring server 28 provides an alert message 120 to the central office equipment 26 for that data storage equipment 22 (e.g., the owner of the data storage equipment 22). The alert message 120 includes a notification of why the data storage equipment 22 transitioned from being in a good situation to a bad situation (e.g., off course, tampering, low power, etc.). Additionally, the central office equipment 26 is able to query the monitoring server 28 for updates and further information regarding data storage equipment status. Accordingly, the owner of the data storage equipment 22 is able to take immediate remedial action rather than have to wait for information from the professional transportation company.

For example, when the data storage equipment 22 and the monitoring circuit 24 are at the location 102(A), all wireless messages 110 from the monitoring circuit 24 to the monitoring server 28 indicate that the data storage equipment 22 and the monitoring circuit 24 are at location 102(A). The wireless messages 110 may further indicate the current power levels of the power sources available to the monitoring circuit 24, any sensed wireless networks and associated network strengths, current temperatures, tampering status, and so on.

As the data storage equipment 22 and the monitoring circuit 24 travels from the location 102(A) to the location 102(B), and so on along the predefined route 100, the monitoring circuit 24 continues to send wireless messages 110 to the monitoring server 28. Such wireless messages 110 include current location data, current sensed information, current status, etc.

In some arrangements, the monitoring circuit 24 is configured to notify the monitoring server 28 that the data storage equipment 22 and the monitoring circuit 24 have reached the location 102(B). In these arrangements, the monitoring circuit 24 sends a wireless message 110 with such a notification as soon as it reaches the location 102(B) rather than wait for the next scheduled transmission of a wireless message 110.

Accordingly, the monitoring server 28 can send an alert message 120 to the central office equipment 26 informing the owner of the data storage equipment 22 that the data storage equipment 22 has arrived at the location 102(B).

In alternative arrangements, the monitoring circuit 24 simply sends wireless messages 110 containing location data to the monitoring server 28. When the monitoring server 28 detects that the data storage equipment 22 and the monitoring circuit 24 have reached the location 102(B), the monitoring server 28 can send an alert message 120 to the central office equipment 26 informing the owner of the data storage equipment 22 that the data storage equipment 22 has arrived at the location 102(B).

Similarly, the central office equipment 26 can be notified once the data storage equipment 22 and the monitoring circuit 24 are off course, i.e., off the predefined route 100 by the predefined distance threshold (e.g., see the location 102(X)). In some arrangements, the monitoring circuit 24 is configured to make such a determination and immediately notify the monitoring server 28 that the data storage equipment 22 and the monitoring circuit 24 is off course. In other arrangements, the monitoring circuit 24 simply sends wireless messages 110 containing location data to the monitoring server 28 and the monitoring server 28 makes such a determination. Once the monitoring server 28 is aware of the off course event, the monitoring server 28 sends an alert 120 to the central office equipment 26. Accordingly, the central office equipment 26 is able to take immediate remedial action (e.g., locate and track down the data storage equipment 22, destroy access to the data stored in the data storage equipment 22, etc.).

In some arrangements, when the data storage equipment 22 goes off course or contact with the monitoring circuit 24 is lost, the monitoring server 28 waits a predefined period of time before taking remedial action (e.g., data destruction, alerting an administrator and prompting the administrator for a command to destroy the data, etc.). If contact with the monitoring circuit 24 is restored or if the data storage equipment 22 is detected to be back on course before the predefined period of time expires, no remedial action is taken. The amount of time is customizable by the user (e.g., destroy access to the data or alert an administrator if contact is lost for more than two hours, four hours, half a day, etc.).

It should be understood that the technology disclosed above provides the framework for customizing access to the status of the data storage equipment 22 while the data storage equipment 22 is in transit. Other data, events, alerts, remedial actions, etc. and are suitable for use as well. Further details will now be provided with reference to FIG. 4.

Figure 4:
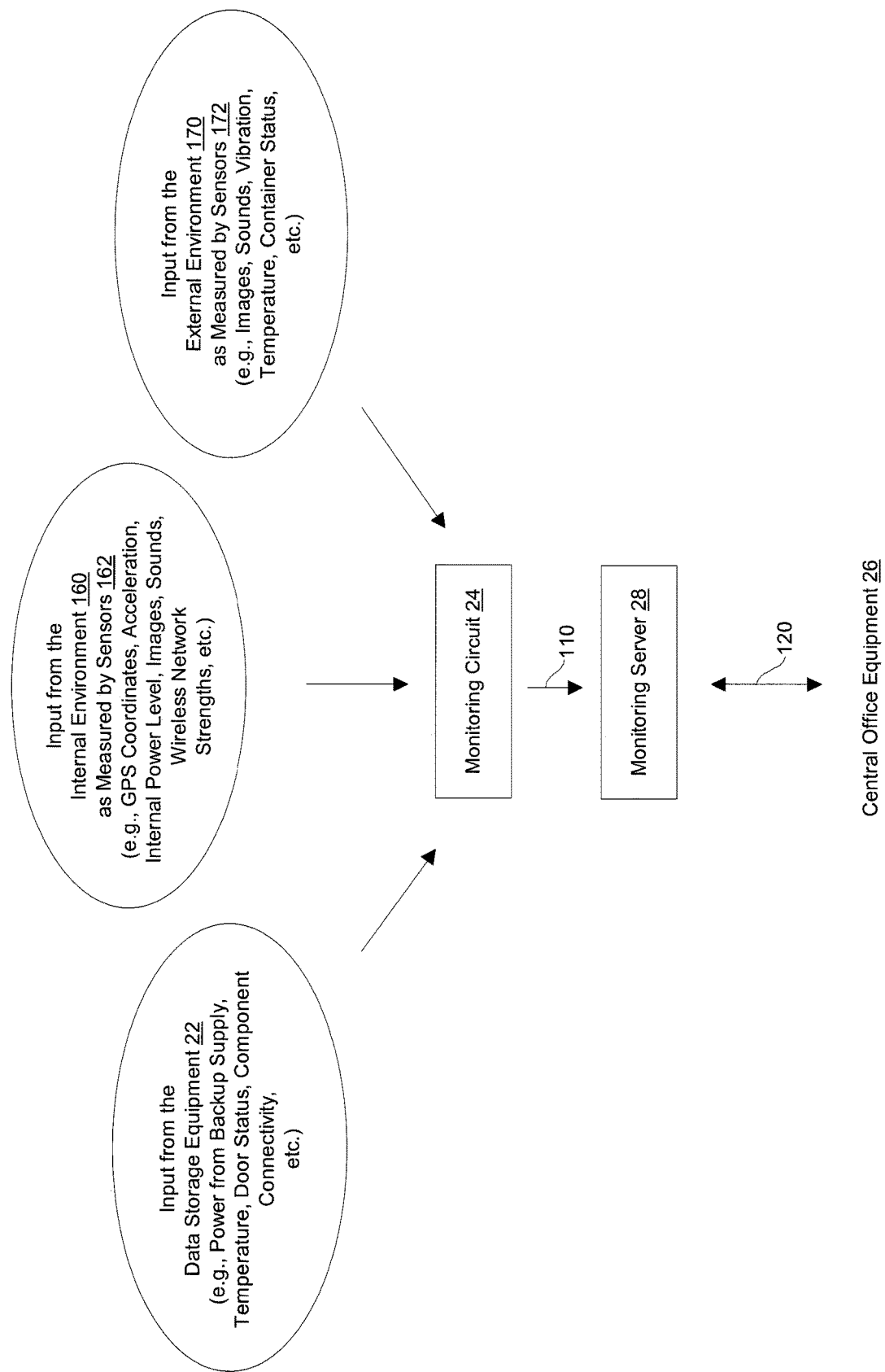
FIG. 4 is a block diagram illustrating particular details of how the electronic circuitry of FIG. 2 is able to provide alerts.

FIG. 4 shows particular details of how the monitoring circuit 24 and the monitoring server 28 operate to provide status regarding the data storage equipment 22 to the central office equipment 26, e.g., the owner of the data storage equipment 22. Such operation begins as soon as the monitoring circuit 24 is activated to provide wireless messages 110 to the monitoring server 28. The central office equipment 26 is then able to access status via communications 120 with the monitoring server 28, e.g., querying the monitoring server 28 via web browser, receiving alerts, etc.

As shown in FIG. 4, the monitoring circuit 24 gathers data from different sources such as from the data storage equipment 22, the internal environment 160 such as via sensors 162, and the external environment 170 via other sensors 172. Such data gathering occurs in an ongoing manner while the monitoring circuit 24 is activated and has power (e.g., continuously, periodically, etc.).

Examples of data that the monitoring circuit 24 can obtain from the data storage equipment 22 include a power level of a backup power supply of the data storage equipment 22, temperature from a temperature sensor of the data storage equipment 22, status of whether doors or panels of the data storage equipment 22 are open/attached/missing/etc., whether the components are properly plugged in or missing, and so on. Other data is suitable for gathering from the data storage equipment 22 as well.

Recall that the form factor of the monitoring circuit 24 may be that of a tablet, a smart phone, a PDA, or similar style mobile device. Such a monitoring circuit 24 may be provisioned with a transceiver (e.g., for cellular communications, for Ethernet communications, etc.), a set of cameras, a set of microphones, etc. Types of data that the monitoring circuit 24 can obtain from the internal environment 160 via the sensors 162 include images (e.g., via the set of cameras), sounds (e.g., via the set of microphones), vibration (e.g., via accelerometers), temperature (e.g., via a set of temperature sensors), local network strengths, and so on. Other data is suitable for gathering from the external sensors 162 as well.

Additionally, when the monitoring circuit 24 has the physical form factor of a mobile device, the monitoring circuit 24 can be augmented with other sensors 172 that do not belong to the data storage equipment 22 or the monitoring circuit 24 per se. Alternatively, the monitoring circuit 24 may take the form of a specialized apparatus that is particularly suited/provisioned with sensors 172 for monitoring the data storage equipment 22 (e.g., a customized assembly with attached sensors 172). The types of data that the monitoring circuit 24 can obtain from the external environment 170 via the sensors 172 include vibration (e.g., via vibration sensors), temperature (e.g., via a set of temperature sensors), humidity, air quality, shock, and container status (e.g., whether panels/doors/etc. have been opened or are missing, etc.). Other data is suitable for gathering from the sensors 172 as well.

With the data then conveyed from the monitoring circuit 24 to the monitoring server 28, the monitoring server 28 is able to automatically evaluate the data and determine whether an alert (or notification) should be sent to the central office equipment 26 (see the communications 120 in FIGS. 3 and 4). Example alerts include arrival alerts to indicate that the data storage equipment 22 has arrived at a planned location 102 (also see FIG. 3), a low power level alert to indicate that backup power from the data storage equipment 22 has dropped to a critically low level, a temperature out-of-range alert to indicate that the data storage equipment 22 resides at a location that has an unfavorable temperature, a tamper alert to indicate that a door/panel/etc. has been opened or that a storage device has been removed, and so on. Further details will now be provided with reference to FIG. 5.

Figure 5:
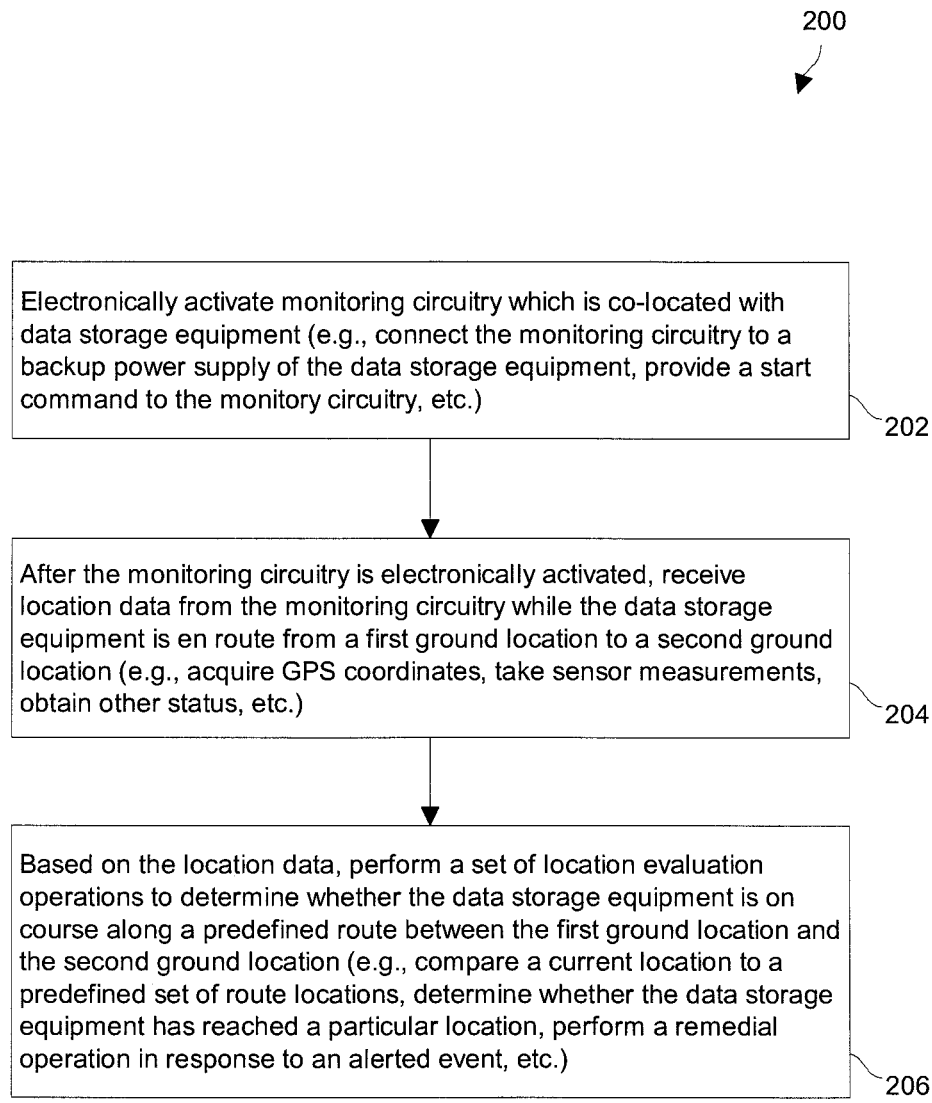
FIG. 5 is a flowchart of a procedure which is performed by the electronic circuitry of FIG. 2.

FIG. 5 is a flowchart of a procedure 200 which is performed by circuitry of the electronic environment 20 to monitor data storage equipment 22 in transit (also see FIG. 1). In some arrangements, the procedure 200 is performed exclusively by the monitoring server 28. In other arrangements, the procedure 200 is performed exclusively by the monitoring circuit 24. In yet other arrangements, the procedure is performed by a combination of the monitoring server 28 and the monitoring circuit 24. It should be understood that the same procedure 200 can be performed at the same time for other data storage equipment 22.

At 202, monitoring circuitry which is co-located with the data storage equipment is electronically activated (e.g., in response to an activation command). In a particular arrangement, the monitoring circuitry draws power from a backup power supply of the data storage equipment, i.e., the same backup power source that provides power temporarily to the data storage equipment circuitry if there is a loss of primary power such a main power feed from the street. In some arrangements, the monitoring circuitry is automatically activated (e.g., based on a control signal from the monitoring server 28, based on a timer, etc.). In other arrangements, a human user manually activates the monitoring circuitry.

At 204, after the monitoring circuitry is electronically activated, location data is received from the monitoring circuitry while the data storage equipment is en route from a first ground location to a second ground location (also see FIG. 3). In some arrangements, the monitoring circuitry is provisioned with GPS circuitry that outputs, as location identifiers, coordinates of the current geolocation which the monitoring circuitry then conveys to the monitoring server.

At 206, based on the location data, a set of location evaluation operations is performed to determine whether the data storage equipment is on course along a predefined route between the first ground location and the second ground location. Here, the monitoring server performs comparison operations between each current location (identified by current location identifiers) and a predefined set of route locations defined by the predefined route between the first ground location and the second ground location (also see FIG. 3). If the deltas are less than a predefined distance threshold, the data storage equipment is on course. However, if a difference between a current location and the predefined set of route locations exceeds the predefined distance threshold, the data storage equipment is considered off course.

When the monitoring server determines that the data storage equipment is off course (e.g., a result of the comparison operation indicates that the data storage equipment is off course by a predefined distance threshold or by an excessive distance to prevent a false alarm caused by a detour), the monitoring server provides an off course alert to central office equipment (e.g., the owner of the data storage equipment). Accordingly, the owner is able to take immediate remedial action.

It should be understood that other alerts based on other information are suitable for use as well. For example, the monitoring server can provide an on course alert when a result of the comparison operation indicates that the data storage equipment has reached a particular route location within a predefined distance threshold. Additionally, the monitoring server can provide a state line alert when the data storage equipment crosses a state line of the United States of America (and town lines, city lines, country borders, etc. are also suitable for use). Furthermore, other alerts are available too such as power level alerts, lost power alerts, tamper alerts, alerts indicating that the power to the data storage equipment has been turned on, alerts indicating that storage devices have been pulled out, etc.

There are a variety of remedial actions that are particularly suited to managing data storage equipment that was in transit. An example remedial action includes gathering and transmitting environmental readings in response to a tampering event (e.g., GPS location, temperature, sensed networks, images, sounds, etc.). Another remedial action includes destroying access to a set of keys which is required to decrypt host data on the data storage equipment to prevent the host data on the data storage system from being understood.

As described above, improved techniques are directed to electronically monitoring data storage equipment 22 while the data storage equipment is in transit. Such techniques provide improvements to the technology, e.g., immediate notification when the data storage equipment 22 is off course, alerts due to events such as loss of backup power/tampering/etc., collection of internal/external data regarding an event, and so on. Since such information may be received directly from a monitoring circuit 24 that is part of the data storage equipment 22 or that is attached to the data storage equipment 22, there is no reliance on any professional transportation company. Moreover, in high security situations, the ability to read data from the data storage equipment 22 may be destroyed thus robustly and reliably protecting the data from falling into the hands of a malicious person.

One should appreciate that the above-described techniques do not merely record information about a device. Rather, the disclosed techniques involve monitoring transit progress and/or data storage equipment status while the data storage equipment is en route between a start location and a destination location. With such techniques, other advantages are available as well such as immediate notification to prevent data from falling into the hands of a malicious person, detailed information about possible tampering events while in transit, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 such as the central office equipment 26 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the disclosed techniques are suitable for application to transporting other types of equipment, systems, and devices in transit. For example, the techniques are suitable for monitoring in transit electronic equipment, vehicles, freight cars, valuable cargo, etc.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

Along these lines it should be understood that the predefined route 100 may be entered into the monitoring server 28 and/or the monitoring circuit 24 ahead of time. Such a predefined route 100 may be provided by specifying a start point and an end point into GPS circuitry. Moreover, it should be understood that it is possible for the data storage equipment 22 and the monitoring circuit 24 to take a detour along the predefined route 100, but that the final destination may still remain the same. Accordingly, certain tolerances, rule, policies, etc. can be built in to precisely alert the central office equipment 26 of particular events. Such modifications and enhancements are intended to belong to various embodiments of the disclosure.

What is claimed is:

1. A method of transporting data storage equipment, the method comprising:
   electronically activating monitoring circuitry which is co-located with the data storage equipment;
   after the monitoring circuitry is electronically activated, receiving location data from the monitoring circuitry while the data storage equipment is en route from a first ground location to a second ground location;
   and based on the location data, performing a set of location evaluation operations to determine whether the data storage equipment is on course along a predefined route between the first ground location and the second ground location;
   wherein electronically activating the monitoring circuitry which is co-located with the data storage equipment includes: powering on the monitoring circuitry such that the monitoring circuitry consumes power from a battery backup power supply of the data storage equipment:
   and wherein the battery backup power supply is integral with the data storage equipment, the battery backup power supply providing a source of backup power to a set of storage processors when the data storage equipment is turned on.

2. A method as in claim 1 wherein receiving the location data from the monitoring circuitry includes:
   acquiring a current location identifier from the monitoring circuitry while the data storage equipment is en route from the first ground location to the second ground location, the current location identifier identifying a current location of the data storage equipment.

3. A method as in claim 2 wherein performing the set of location evaluation operations includes:
   performing a comparison operation which compares the current location identified by the current location identifier to a predefined set of route locations defined by the predefined route between the first ground location and the second ground location to determine whether the data storage equipment is currently on course.

4. A method as in claim 3, further comprising:
   providing an off course alert when a result of the comparison operation indicates that the data storage equipment is off course by a predefined distance.

5. A method as in claim 3, further comprising:
providing an on course alert when a result of the comparison operation indicates that the data storage equipment has reached a particular route location of the predefined set of route locations defined by the predefined route between the first ground location and the second ground location.

6. A method as in claim 3, further comprising:
providing a state line alert when a result of the comparison operation indicates that the data storage equipment has crossed a state line between two bordering states of the United States of America.

7. A method as in claim 1, further comprising: configuring the monitoring circuitry to consume power from a secondary power supply which is different from the battery backup power supply of the data storage equipment when the monitoring circuitry is no longer able to consume power from the battery backup power supply of the data storage equipment.

8. A method as in claim 7, further comprising: configuring the monitoring circuitry to provide a power alert when the monitoring circuitry is no longer able to consume power from the battery backup power supply of the data storage equipment.

9. A method as in claim 1, further comprising:
receiving a tamper alert from the monitoring circuitry when the monitoring circuitry detects that the data storage equipment has encountered a tampering event.

10. A method as in claim 9, further comprising:
in response to the tamper alert, collecting surveillance data from the monitoring circuitry.

11. A method as in claim 10 wherein collecting the surveillance data includes:
electronically reading status information from electronic circuitry of the data storage equipment and conveying that status information to a central office.

12. A method as in claim 10 wherein collecting the surveillance data includes:
electronically gathering environmental information from a current external environment of the data storage equipment and conveying that environmental information to a central office.

13. A method as in claim 9, further comprising:
in response to the tamper alert, placing host data which is stored in the data storage equipment in an unintelligible state.

14. A method as in claim 13 wherein placing the host data on the data storage equipment into the unintelligible state includes:
destroying access to a set of keys which is required to decrypt the host data on the data storage system to prevent the host data on the data storage system from being understood.

15. A method as in claim 1, further comprising:
prior to electronically activating the monitoring circuitry, electronically connecting the monitoring circuitry to the data storage equipment in preparation for shipping the data storage equipment from the first ground location to the second ground location.

16. A method as in claim 13, further comprising:
electronically disconnecting the monitoring circuitry from the data storage equipment upon arrival of the data storage equipment at the second ground location, the monitoring circuitry including a geolocation circuit that is constructed and arranged to identify a current geolocation of the monitoring circuitry, and a transceiver that is constructed and arranged to wirelessly transmit the current geolocation of the monitoring circuitry to a central office.

17. A method as in claim 1, further comprising:
after the monitoring circuitry has been activated and at least some location data has been received from the monitoring circuitry, outputting a lost equipment alert in response to an absence of receiving further location data from the monitoring circuitry for a predefined amount of time.

18. A method as in claim 1 wherein the data storage equipment includes a cabinet, data storage hardware housed within the cabinet, and the battery backup power supply; and wherein the method further comprises:
attaching the monitoring circuitry to the cabinet and connecting the monitoring circuitry to sensors installed within the data storage equipment.

19. A method as in claim 1 wherein the set of storage processors and the battery backup power supply are held within a common enclosure of the data storage equipment, the set of storage processors being constructed and arranged to perform data storage operations on a set of storage devices when the data storage equipment is turned on.

20. A method as in claim 19 wherein powering on the monitoring circuitry such that the monitoring circuitry consumes power from a battery backup power supply of the data storage equipment includes:
supplying power to the monitoring circuitry while the data storage equipment is turned off.

21. Electronic apparatus, comprising:
data storage equipment including a cabinet, data storage hardware housed within the cabinet, and a battery backup power supply; and
monitoring circuitry coupled with the data storage equipment and being co-located with the data storage equipment, the monitoring circuitry being constructed and arranged to:
electronically activate,
after electronically activating, provide location data from the while the data storage equipment is en route from a first ground location to a second ground location to enable performance of a set of location evaluation operations to determine whether the data storage equipment is on course along a predefined route between the first ground location and the second ground location;
wherein the monitoring circuitry, when electronically activated, is configured to powering on such that the monitoring circuitry consumes power from the battery backup power supply of the data storage equipment; and
wherein the battery backup power supply is integral with the data storage equipment to provide a source of backup power to the data storage hardware when the data storage equipment is turned on.

* * * * *